No. 624,963. Patented May 16, 1899.
H. M. NYE.
FEED WATER PURIFIER AND BOILER SKIMMER.
(Application filed Apr. 30, 1898.)
(No Model.)

WITNESSES:

INVENTOR
Herman M. Nye.
BY

ATTORNEYS.

THE NORRIS PETERS CO., PHOTO-LITHO., WASHINGTON, D. C.

UNITED STATES PATENT OFFICE.

HERMAN M. NYE, OF ELMWOOD, NEBRASKA.

FEED-WATER PURIFIER AND BOILER-SKIMMER.

SPECIFICATION forming part of Letters Patent No. 624,963, dated May 16, 1899.

Application filed April 30, 1898. Serial No. 679,346. (No model.)

*To all whom it may concern:*

Be it known that I, HERMAN M. NYE, of Elmwood, in the county of Cass and State of Nebraska, have invented a new and Improved Feed-Water Purifier and Boiler-Skimmer, of which the following is a full, clear, and exact description.

The object of the invention is to provide a new and improved feed-water purifier and boiler-skimmer arranged to thoroughly purify the water previous to its entrance into the boiler and to remove all foreign matter contained in the boiler and floating on the surface of the water, the arrangement being very simple and durable in construction and not liable to get out of order.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1:
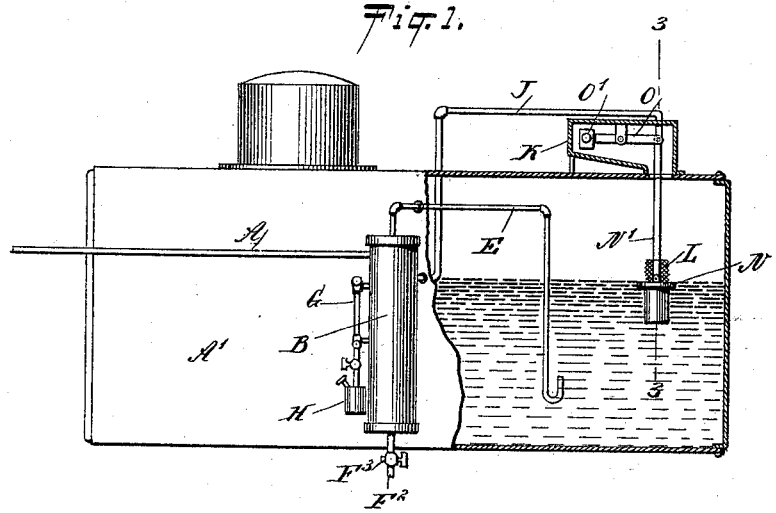
Figure 2:
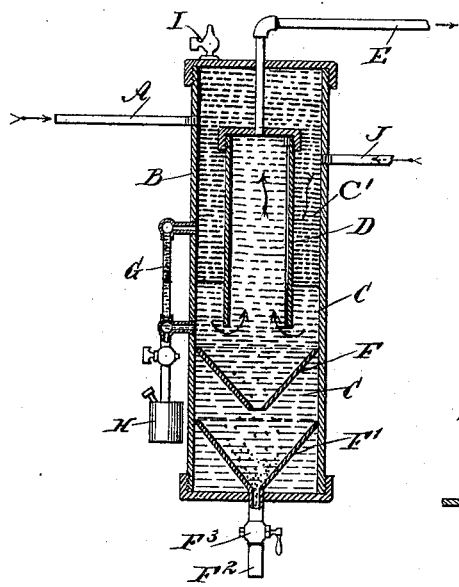
Figure 3:
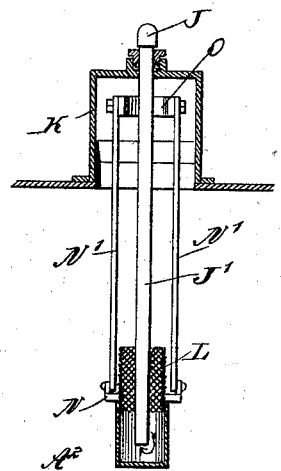
Figure 4:
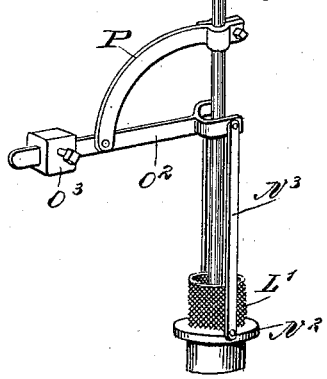
Figure 4:

Figure 1 is a sectional side elevation of the improvement as applied. Fig. 2 is an enlarged sectional side elevation of the purifier. Fig. 3 is an enlarged vertical section of the skimmer on the line 3 3 of Fig. 1; and Fig. 4 is a perspective view of a modified form of skimmer applied to boilers having a manhole, part of the boiler being shown in section.

A feed-water pipe A, connected with a feed-water pump or the like, discharges into the upper end of a vessel B, arranged on one side of the boiler A', as is plainly indicated in Fig. 1. In the vessel B is contained water C and oil C', floating on the top of the water, owing to its specific gravity, it being lighter than the water, and into the water extends the lower end of a tube D, arranged within the vessel B and connected at its closed top by a pipe E with the interior of the boiler A', the lower end of the pipe discharging the purified water into the water-compartment of the boiler. In the bottom of the vessel B are arranged funnels F F', located one above the other and both contained within the water C, so that the feed-water entering the vessel B through the pipe A passes down through the oil C', and in doing so sediment and other impurities become separated, the impurities and sediment dropping through the water C into the funnels F F' to be from time to time removed from the lowermost funnel F' by means of an outlet-pipe $F^2$, having a cock $F^3$. The purified water passes up the tube D to then flow through the pipe E into the water-compartment of the boiler. Into the upper end of the vessel B also discharges a pipe J, which extends with its other end J' into the boiler A' below the water-level of the water contained in the boiler. The extreme lower end of the pipe J extends within a float or skimmer L in the form of a cup with a perforated or reticulated upper end and supported in a ring N, carried by links N', connected with one end of a lever O, fulcrumed in a chest K, secured to the top of the boiler A' and in communication with the steam-compartment thereof. A weight O' is secured on the free end of the lever O to counterbalance the skimmer L, so that the latter rises and falls with the level of the water contained in the boiler A'. Now it is evident that by the arrangement described any foreign matter floating on the surface of the boiler-water is collected by the skimmer L and passes up through the pipe J into the vessel B, together with the water carrying the foreign matter. This boiler-water and the foreign matter in passing to the pipe E first passes down through the oil C', in which the foreign matter becomes separated from the water, and drops into the funnel F, while the boiler-water rises in the tube D and passes by the pipe E back into the boiler. Thus it will be seen that by the arrangement described the feed-water is relieved of sand and other sediment and impurities, and any floating substances on the boiler-water are removed therefrom and deposited in the same vessel that receives the sediment from the feed-water, both the foreign matter and sediment being discharged from time to time by opening the cock $F^3$, as previously explained.

The vessel B is provided with a gage G for indicating the height of the column of oil C' in the vessel B, and an oil-feed H is also provided for filling the vessel B with the desired amount of oil.

The device is very simple and durable in construction, is not liable to get out of order, and is completely automatic in operation.

In the modified form shown in Fig. 4 the skimmer-tube L' is secured on a ring N², connected by links N³ with a lever O², fulcrumed on a bracket P, clamped or otherwise secured to the pipe J², leading from the inside of the skimmer-tube to the water-purifier. On the outer or free end of the lever O² is secured a weight O³ for counterbalancing the skimmer to cause the latter to rise and fall with the water in the boiler. The pipe J² passes through a stuffing-box on the top of the boiler A², provided with a manhole for giving access to the parts of the skimmer whenever necessary.

Having thus fully described my invention, I claim as new and desire to secure by Letters Patent—

1. A device of the class described, provided with a vessel adapted to contain water and oil, and connected with the feed-water supply, and a tube extending with its lower, open end into the water, the tube having connection with the boiler, so that the feed-water passes through the oil in order to pass into the said tube and finally to the boiler, substantially as shown and described.

2. A device of the class described, provided with a vessel adapted to contain water and oil, and having connection with the feed-water supply, a tube in the said vessel and extending with its lower open end into the water, so that the feed-water in order to reach the tube has to pass downward through the oil, a pipe leading from the tube to the water-compartment of the boiler, and funnels in the lower end of said vessel and extending one above the other within the water, substantially as shown and described.

3. A device of the class described, provided with a vessel adapted to contain water and oil, and having connection with the feed-water supply, a tube in the said vessel and extending with its lower open end into the water, so that the feed-water in order to reach the tube has to pass downward through the oil, a pipe leading from the tube to the water-compartment of the boiler, and funnels in the lower end of said vessel and extending one above the other within the water, one of the funnels having a valved outlet-pipe, substantially as shown and described.

4. A device of the class described, provided with a vessel adapted to contain water and oil, and having connection with the feed-water supply, a tube in the said vessel and extending with its lower open end into the water, so that the feed-water in order to reach the tube has to pass downward through the oil, a pipe leading from the tube to the water-compartment of the boiler, funnels in the lower end of said vessel and extending one above the other within the water, a skimmer comprising a perforated tube, and a pipe leading from the inside of said tube to the said vessel, substantially as shown and described.

5. A device of the class described, provided with a vessel adapted to contain water and oil, and having connection with the feed-water supply, a tube in the said vessel and extending with its lower open end into the water, so that the feed-water in order to reach the tube has to pass downward through the oil, a pipe leading from the tube to the water-compartment of the boiler, funnels in the lower end of said vessel and extending one above the other within the water, a skimmer comprising a perforated tube, and a pipe leading from the inside of said tube to the said vessel, said skimmer-tube being counterbalanced to rise and fall with the water in the boiler, substantially as shown and described.

HERMAN M. NYE.

Witnesses:
 JOHN A. WRIGHT,
 H. H. DICKMAN.